C. NAGEL.
WEIGHING OR MEASURING APPARATUS.
APPLICATION FILED JULY 16, 1913.
1,092,741.
Patented Apr. 7, 1914.
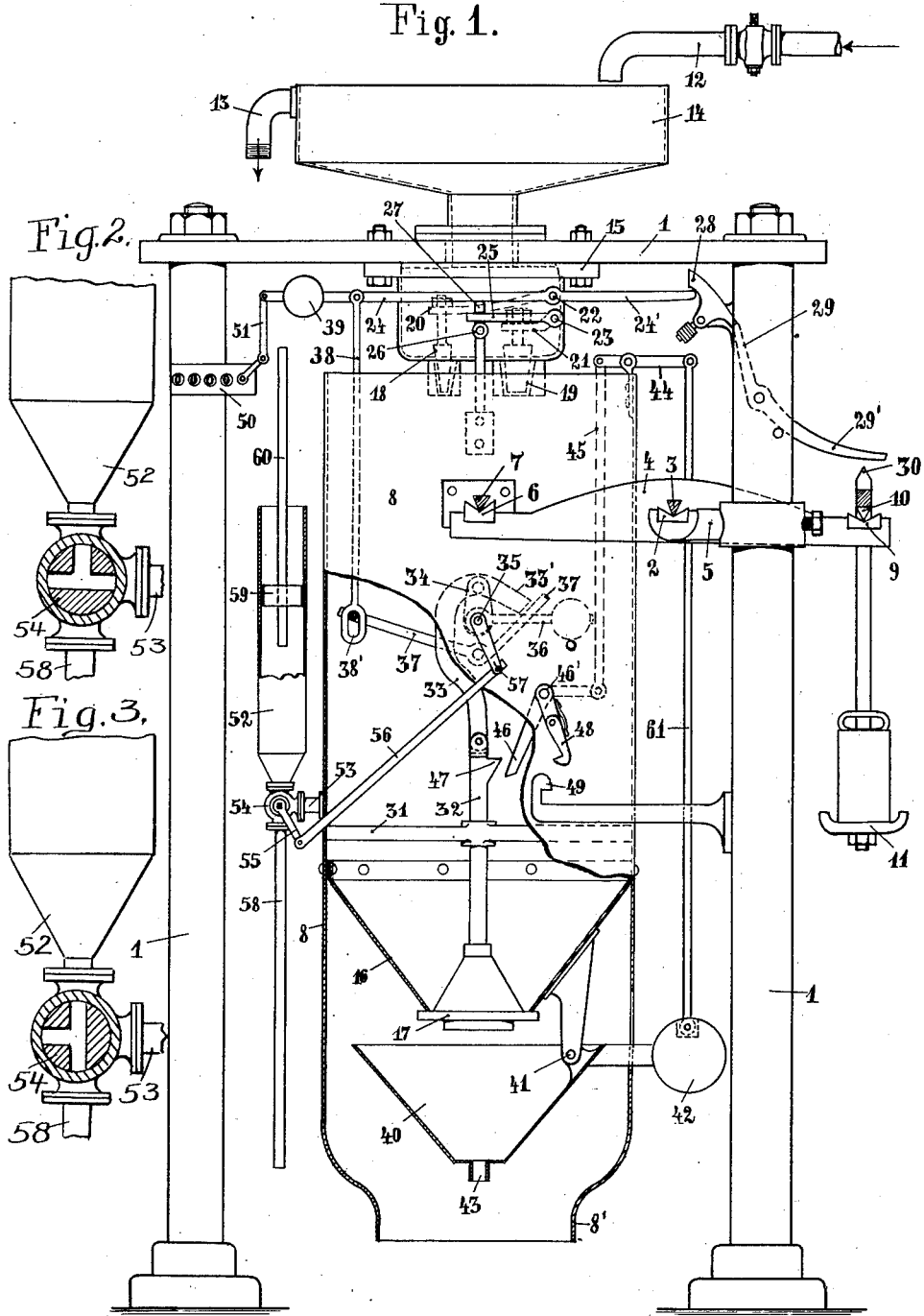

UNITED STATES PATENT OFFICE.

CARL NAGEL, OF GLIESMARODE, BRUNSWICK, GERMANY.

WEIGHING OR MEASURING APPARATUS.

1,092,741.  Specification of Letters Patent.  Patented Apr. 7, 1914.

Application filed July 16, 1913. Serial No. 779,353.

*To all whom it may concern:*

Be it known that I, CARL NAGEL, owner of a manufactory, citizen of the Duchy of Brunswick, Empire of Germany, residing at Gliesmarode, Brunswick, Germany, have invented certain new and useful Improvements in Weighing or Measuring Apparatus, of which the following is a specification.

My invention relates to improvements in weighing or measuring apparatus, and more particularly in apparatus for taking samples from weighing or measuring receptacles which are adapted to be opened by valves or the like.

The object of the improvements is to provide an apparatus by means of which samples of liquids can automatically be taken from such receptacles.

With this object in view my invention consists in so connecting a measuring member provided on the weighing or measuring receptacle with the valve or closing member of the receptacle, that during the filling period the said measuring member communicates with the receptacle and is automatically disconnected from the receptacle and emptied after the closing member has been brought into open position.

Furthermore my invention consists in providing a measuring member which is considerably narrower at its top end than at its bottom end, in order that in such cases in which the receptacle is filled to different levels the volumes of the samples taken from the receptacles are but slightly different.

In order that the capacity of the measuring member can be varied I mount the narrow part of the measuring member on a closing disk in the form of a piston which is adjustable within the measuring member.

For the purpose of explaining the invention a structural embodiment of the same has been shown in the accompanying drawings in which the same letters of reference have been used in all the views to indicate corresponding parts.

In said drawings Figure 1, is a side view of an apparatus embodying the invention partly in section. Figs. 2 and 3, are vertical cross-sections of a cock valve, showing the cock in different positions.

Before describing those parts to which my invention more particularly relates I shall first describe a liquid weighing apparatus in which my invention is preferably embodied.

Referring to Fig. 1, a stationary frame 1 is provided with a pair of brackets 5 disposed at the rear of the frame 1 and equipped with bearing plates 2. On the said bearing plates a weighing beam 4 is supported by means of an edged bearing block 3. At one of its ends, and in the example shown in the figure at the left hand end, the said beam is bifurcated, and on this bifurcated end a receptacle 8 is suspended by means of edge bearings 6, 7. On an edge bearing 9, 10 provided at the opposite end of the beam a scale 11 for the weights is supported. The receptacle 8 is designed for receiving the liquid to be weighed, and it is provided with a partition wall 16 in which is a discharge valve 17. The liquid to be weighed is supplied from a vessel 14 equipped with an overflow 13 and an admission pipe 12. The vessel 14 is secured to the frame 1 by means of a flange 15, and its bottom is equipped with two discharge valves 18 and 19 of different sizes. These valves which in the figure have been shown in open position are suspended from arms 20 and 21 which are secured internally of the vessel 14 to horizontal shafts 22 and 23. Outside the vessel the shafts are equipped with levers 24 and 25 respectively. The lever 25 which belongs to the larger valve 19 bears on an abutment 26 connected with the measuring receptacle 8. In the construction shown in the figure the said abutment is in the form of a roller. The lever 24 which belongs to the smaller valve 18 bears on a nose 27 of the lever 25, so that both valves are opened by means of the abutment 26 when the measuring receptacle 8 is lifted. When the measuring receptacle 8 has been filled and moves downward, at first only the large valve 19 must be moved into closing position and the small one must for the present remain open, in order that the exact weight be discharged into the receptacle through the small valve, as is known in automatic weighing machines. To effect this, an arm 24' on the lever 24 extends beyond its fulcrum 22. When the valve 18 moves into open position, the arm 24' is caught by a pawl 28 which is held in operative position by an arm 29 having a rocking support on the frame 1. A rearward extension 29' of the said arm is disposed with its end in the path of an abutment member 30 which rises together with the weight scale 11 and rocks the arm 29 at the end of the filling operation so as to release the pawl 28 and to permit the valve 18 to be seated by gravity. The parts have such dimensions, that the large valve 19 which controls the main filling operation of the receptacle 8 is seated after the first part of the upward movement of the scale 11, while the small valve 18 which controls the exact filling operation is closed when the exact weight of the liquid has been obtained.

The discharge valve 17 of the measuring receptacle 8 is equipped with a valve stem 32 which is guided for example in a bridge member 31 and is suspended from a horizontal rock shaft 35 located within the receptacle 8 by means of a link 33 and a crank 34. Therefore the discharge valve 17 can be opened and closed by turning the shaft 35. In the construction shown in the drawings the valve 17 is opened by turning the shaft 35 to the left. A weighted lever 36 connected with the shaft 35 and provided to balance the unweighted valve 17 and its gearing 32, 33, 34 prevents the shaft 35 from being turned to the left during the filling operation. In the position of the parts shown in Fig. 1 the crank 34 to which the link 33 is connected is in its neutral position, so that the weighted valve 17 can not accidentally be opened. As soon as the receptacle 8 has been filled exactly to the desired weight, and the lever 24 which controls the small valve 18 drops, a rocking lever 37 connected with the lever 24 by a rod 38 strikes against the crank 34 or an extension 33' of the link 33, whereby the opening movement of the shaft 35 is started. Thereupon the valve 17 which is now loaded by the liquid within the receptacle effects the further movement of the shaft 35 and thereby the opening of the receptacle 8. The lever 24 carries a subsidiary weight 39 which is provided to increase the blow of the lever 37 and thereby to assure the opening movement of the valve 17. If the lever 37 is mounted on the receptacle 8 a clearance 38' may be provided between the lever 37 and the rod 38, in order that during the first part of the downward movement of the receptacle 8 the lever 37 does not affect the extension 33' or the valve 18.

In order that the valve 17 after being opened can not be prematurely closed as the load of the liquid bearing thereon is gradually discharged and under the action of the weighted lever 36, the following mechanism is provided: Below the partition wall 16 a capacious vessel 40 is provided within the receptacle 8 which is adapted to rock about a lateral axis 41, and is normally held in horizontal position by suitable means such as a counterweight 42. The bottom of the said vessel is formed with an opening 43 which is so small that the vessel 40 can be emptied but slowly when it is being filled from the receptacle 8 with the valve 17 in open position. The load of liquid within the vessel 40 is in excess of the counterweight 42 and rocks the vessel about its axis 41, and in this position the vessel is held during the whole discharging operation of the receptacle. The vessel is connected by a link 61 with a lever 44 which operates a pawl 46 through the agency of a link 45. The said pawl is so mounted on the receptacle 8 that when the vessel 40 is being tilted it engages a nose 47 on the valve stem 32 which has before been shifted downward, so that the valve 17 is locked in its open position. Only at the end of the discharge and when the vessel 40 after being emptied again is rocked upward, the valve is again released, whereupon the weighted lever 36 closes the valve 17. The spout 8' of the receptacle 8 may be arranged above a collecting tank, or it may be connected through a suitable pipe with the place of use.

As the scale 11 which carries the weights lifts the empty receptacle 8 into its elevated position shown in Fig. 1 and reopens the inlet valves 18 and 19 by means of the abutment roller 26 provided on the receptacle 8, a locking member must be provided by means of which the receptacle 8 is held in its lower position until it has been completely emptied. Locking members of this kind are well known in automatic weighing machines. To show what may be done, the shaft 46' of the pawl 46 is provided with a hook 48 which engages below a hook 49 secured to the frame 1 as soon as the receptacle 8 has reached its lower position and the vessel 40 is being tilted downward. Thereby the receptacle 8 is held in its lower position, until the vessel has been rocked into its normal position.

The weighing apparatus may be provided with a counting mechanism 50 which is adapted to be operated for example from the valve lever 24 by means of a rod 51. All the parts of the weighing apparatus may be inclosed within a casing, in which case only the counting mechanism 50 is visible.

Referring now to those parts to which my invention more particularly relates, I wish it to be understood, that the weighing apparatus described above has been chosen merely as an example to explain the manner of putting my invention into practice, and that it may be embodied in apparatus of a different type. The receptacle 8 is equipped with a measuring member 52, here shown as a pipe which is connected therewith by a pipe 53. The pipe 53 is equipped with a two-way cock 54 which is adapted to alternately connect the measuring pipe 52 with the receptacle 8 and a discharge pipe 58, and which is provided with an operating arm 55. The latter is connected by a link 56 with a crank arm 57 secured to the shaft 35, so that the cock is adapted to be shifted by the rotation of the shaft 35. The arrangement is such that during the filling operation of the receptacle 8 the cock 54 throws the pipe 52 into communication with the receptacle 8 (Fig. 2), so that the said pipe is filled, and that during the emptying operation, that is while the valve 17 of the receptacle 8 is in open position, the cock disconnects the measuring pipe 52 from the receptacle 8 and connects the same with the discharging pipe 58, as is shown in Fig. 3. Therefore a sample can be taken from each charge of the receptacle. If this is not done, the contents of the measuring pipe 52 flow through the discharge pipe 58 to the main part of the filling charge which flows from the spout 8'.

If the level of the liquid contained in the receptacle 8 is not always the same, as may be the case if liquids of different specific gravity are measured, and it is desirable that the amount of the samples taken from the weighing receptacle be the same or nearly the same, the upper part of the measuring pipe 52 is made with a comparatively small cross-section, and preferably it is made in the form of a capillary tube. In the construction shown in Fig. 1 a thin tube 60 is fitted into the upper part of the measuring pipe 52 by means of a disk 59 which is adapted to be shifted in the manner of a plunger. This construction is advantageous also in this respect, that the contents of the measuring pipe can be regulated by shifting the piston 59 which is provided with the capillary tube, upward or downward within the measuring pipe 52.

I claim herein as my invention:

1. In an apparatus for measuring liquids, the combination with a receptacle adapted to receive the liquid, a valve to discharge the liquid from said receptacle and means for opening said valve, of a tubular measuring member communicating with said receptacle, and automatic means controlled by the valve opening means to disconnect the measuring member from the receptacle and to open the same.

2. In an apparatus for measuring liquids, the combination with a receptacle adapted to receive the liquid, a valve to discharge the liquid from said receptacle and means for opening said valve, of measuring means providing a measuring chamber communicating with said receptacle, the upper portion of said chamber being reduced as compared to the main portion, and automatic means controlled by the valve opening means to disconnect the measuring chamber from the receptacle and to open the same.

3. In an apparatus for measuring liquids, the combination with a receptacle adapted to receive the liquid, a valve to discharge the liquid from said receptacle and means for opening said valve, of a tubular measuring member communicating with said receptacle, adjustable means within said member for varying the capacity thereof, and automatic means controlled by the valve opening means to disconnect the measuring member from the receptacle and to open the same.

4. In an apparatus for measuring liquids, the combination with a receptacle adapted to receive the liquid, a valve to discharge the liquid from said receptacle and means for opening said valve, of measuring means providing a measuring chamber communicating with said receptacle, the upper portion of said chamber being reduced as compared to the main portion, means within said chamber for varying the capacity thereof, and automatic means controlled by the valve opening means to disconnect the measuring member from the receptacle and to open the same.

In testimony whereof I have hereunto set my hand in presence of two subscribing witnesses.

CARL NAGEL.

Witnesses:
WILHELM LEHRKE,
JULIUS SECKEL.

Copies of this patent may be obtained for five cents each, by addressing the "Commissioner of Patents, Washington, D. C."